United States Patent [19]

Gigliotti et al.

[11] Patent Number: 6,138,143

[45] Date of Patent: Oct. 24, 2000

[54] METHOD AND APPARATUS FOR ASYNCHRONOUS TRANSACTION PROCESSING

[75] Inventors: Samuel Scott Gigliotti, Alpharetta; Vijay Kumar Madam, Norcross, both of Ga.

[73] Assignee: GenRad, Inc., Westford, Mass.

[21] Appl. No.: 09/239,100

[22] Filed: Jan. 28, 1999

[51] Int. Cl.⁷ .................................................. G06F 13/00
[52] U.S. Cl. ............................ 709/203; 709/101; 707/201
[58] Field of Search ........................ 709/201, 203, 709/205, 213, 217, 218, 219, 101, 224; 707/201, 202

[56] References Cited

U.S. PATENT DOCUMENTS

| | | | |
|---|---|---|---|
| 5,187,787 | 2/1993 | Skeen et al. | 395/600 |
| 5,295,242 | 3/1994 | Mashruwala et al. | 395/159 |
| 5,367,624 | 11/1994 | Cooper | 395/157 |
| 5,398,336 | 3/1995 | Tantry et al. | 395/600 |
| 5,432,926 | 7/1995 | Citron et al. | 395/575 |
| 5,548,756 | 8/1996 | Tantry et al. | 395/600 |
| 5,557,798 | 9/1996 | Skeen et al. | 395/650 |
| 5,561,797 | 10/1996 | Gilles et al. | 395/600 |
| 5,734,896 | 3/1998 | Rizvi et al. | 395/618 |
| 5,781,910 | 7/1998 | Gostanian et al. | 707/201 |
| 5,787,000 | 7/1998 | Lilly et al. | 364/468.01 |
| 5,799,305 | 8/1998 | Bortvedt et al. | 707/10 |
| 5,822,585 | 10/1998 | Noble et al. | 395/680 |
| 5,850,507 | 12/1998 | Ngai et al. | 707/202 |
| 5,852,732 | 12/1998 | Freund et al. | 707/202 |
| 5,872,981 | 2/1999 | Waddington et al. | 710/200 |
| 5,890,161 | 3/1999 | Helland et al. | 707/103 |
| 5,923,833 | 7/1999 | Freund et al. | 707/202 |
| 5,924,095 | 7/1999 | White | 707/10 |
| 5,956,506 | 9/1999 | Cobb et al. | 709/101 |
| 5,958,004 | 9/1999 | Helland et al. | 709/101 |
| 5,987,463 | 11/1999 | Draaijer et al. | 707/10 |
| 6,012,094 | 1/2000 | Leymann et al. | 709/230 |
| 6,070,197 | 5/2000 | Cobb et al. | 709/303 |

FOREIGN PATENT DOCUMENTS

WO 97/35270  9/1997  WIPO.
WO 98/44438  10/1998  WIPO.

OTHER PUBLICATIONS

"TIB/ObjectBus 2.0 ORB Brings Multicast Push and Industrial–Strength Messaging to Distributed Object Computing", TIBCO Software, Inc., Jul. 21, 1997.

"ND 4.0 Technical Brief, Enterprise Network Application Platform", Net Dynamics, Inc.

(List continued on next page.)

*Primary Examiner*—Moustafa M. Meky
*Attorney, Agent, or Firm*—Nutter, McClennen & Fish, LLP

[57] ABSTRACT

In an asynchronous transaction processing method, system and computer program product, a transaction is initiated by a client object when the client object initiates a transaction context and registers with the transaction context as a participant in the transaction. The client object also publishes an event, the event including a reference to the transaction context, a reference to the client object and information. At least one server object responsive to, or subscribing to, the event registers with the transaction context identified in the event, performs a logical operation using the information provided in the event, places a vote to commit or roll back the transaction with the transaction context and calls back the client object with a response to the event using the reference to the client object included in the event. Upon receiving a call back from the at least one server object responsive to the event, the client object place a vote to commit or roll back the transaction with the transaction context. The client object then requests that the transaction context close the transaction. The transaction context reviews the votes and if all of the transaction participants have voted to commit the transaction, the transaction context commits the transaction data to one or more databases. If at least one participant in the transaction has voted to roll back the transaction, the transaction context signals the client object of the roll back vote and causes the transaction to be rolled back.

39 Claims, 5 Drawing Sheets

OTHER PUBLICATIONS

"Cold Fusion, White Paper, Version 4.0", 1998 Allaire Corporation, 17 pages.

Hackathorn, Richard "When Information links change constantly, Publish and Subscribe promises robust data delivery", BYTE Magazine, Jun. 1997.

Finkelstein, Shel, "Java in the Enterprise", Java One Conference, Apr. 2, 1997.

"GemStone/J 2.0 The First EJB Server Based on CORBA and an OTM," GemStone Systems, Inc., Oct. 1998.

METHOD AND APPARATUS FOR ASYNCHRONOUS TRANSACTION PROCESSING

FIELD OF THE INVENTION

The invention provides a method and apparatus for providing asyncronous transaction processing in a distributed object computing environment.

BACKGROUND OF THE INVENTION

Consistency is a fundamental design goal of any transaction processing system. For example, when transferring money from a savings account to a checking account, the total of the two accounts must remain the same. If the savings account is debited but the checking account is not credited, the customer will be dissatisfied. On the other hand, if the checking account is credited but the savings account is not debited, the bank will become concerned.

A transaction is a collection of operations that performs a single logical action in a database application. In the above example, conducting an account transfer is a transaction. Debiting the savings account is one operation in the account transfer transaction, and crediting the checking account is another operation. In order to preserve consistency, every operation of a transaction must succeed or the entire transaction must fail—that is, transactions can leave no work partially done. This requirement is called "atomicity."

Under nonnal conditions, consistency can be enforced in a transaction processing system by simply carrying out every operation in the transaction. However, software bugs, hardware crashes, and power outages can cause a computer system to fail. When a failure occurs, some information, particularly information that is stored in volatile memory such as RAM, may be lost and consistency violated. For example, a banking transaction processing system might debit the savings account but crash before crediting the checking account. To guarantee consistency, a transaction processing system must ensure that all of the operations of a transaction are executed or, if one or more of the operations that make up the transaction fails, none of the operations of the transaction are executed.

If a transaction cannot be successfully completed, and only some of the operations are executed, then the transaction must be "rolled back" and the completed operations undone. On the other hand, if all the operations in a transaction successfully execute, then the transaction is "committed" and all of the operations are permanently stored in a database.

A distributed transaction is one in which operations occur on several different computers or in several different processes in a computer network. For example, checking account operations might occur on a first computer, savings account operations might occur on a second computer, and the request to transfer funds from a savings account to a checking account might originate at a third computer used by a bank teller. Every process or computer that is involved in the transaction is called a "participant." In a distributed transaction, partial failures can occur in which some computers are working while others are not, or where the computers are working but communication links between the computers have failed. Partial failures can also occur where one operation fails because it violates a logical restraint, either in the system or on its local computer.

The benefits of a distributed transaction system include improved performance and scalability, that is, the ability to support additional users by adding additional computers without losing performance. Because failures in a distributed system are usually partial ones, another benefit is improved reliability—if one computer fails, often the system continues to operate. However, the possibility of a partial failure makes the assurance of consistency more problematic. For example, the computer that processes savings account operations might function nonnally, deducting the debit, whereas the computer that processes the checking account operations might fail without adding the credit.

In order to preserve consistency, transaction processing systems implement a "commitment protocol." One common commitment protocol for distributed transactions is the "two-phase commit" protocol. A two-phase commit protocol generally includes two phases: a prepare transaction phase and a resolve transaction phase.

First, in the prepare transaction phase, the creator of a transaction asks each participant to prepare or abort the transaction. Each participant must determine whether it wishes to commit or abort the transaction. If the participant wishes to commit the transaction, it records the fact that the transaction is prepared for commitment to its local transaction log in non-volatile storage. The local transaction log will have already recorded the old and new values of the local changes made by that transaction to the database. Then the participant sends a "commit" vote back to the owner.

If the participant decides to abort, it records an abort of the transaction to non-volatile storage and sends a "roll back" vote back to the owner. There are a number of reasons why a participant might decide to abort. An operation may violate some constraint imposed on the logic of that operation. For example, if debiting the savings account would reduce the balance in the savings account below zero, then that participant would abort the transfer transaction.

Second, in the resolve transaction phase, the creator collects all the votes from the participants. If all the participants voted yes, then the owner records a commit of the transaction to its transaction log in non-volatile storage. At this point the transaction is committed. Then the owner sends a message to each participant to commit the transaction.

If any participant voted to roll back the transaction, then the creator records an abort of the transaction to non-volatile storage, and sends a message to each participant to roll back the transaction. Each participant that placed a prepared to commit record in non-volatile storage will wait for a commit or roll back message from the creator to take action. One important application for a distributed transaction processing system is the Manufacturing Execution System ("MES"). Generally, an MES is an enterprise-wide software application integrated with one or more shop floors in a manufacturing company. Goals of an MES include sending timely shop floor data to the enterprise and incorporating enterprise-wide requirements into the shop floor.

Ideally, an MES should collect data from a variety of factory floor devices such as SCADA, controllers, test equipment, bar code scanners and others. An MES should also allow definition of bills of material and specification of routing steps and operation sequences. An MES can also define shop floor equipment, including its capabilities and requirements, and manufacturing employees, including their training and certifications. Output from an MES can include order tracking, work-in-process traceability, defect and rework management, work instruction management, data collection and statistical process control and statistical quality control ("SPC/SQC"), process licensing, item qualification, labor tracking and finite scheduling. An MES thus improves management's visibility into its manufacturing processes and interacts with enterprise resource planning and supply chain management software and professionals to reduce manufacturing lead times and meet customer and manufacturing deadlines.

Traditional transaction processing systems are inadequate for modern MES applications which must coordinate data flow from around a manufacturing floor and from manufacturing operations around the world in real time or near real time. In addition, manufacturing operations run around the clock seven days a week. Traditional transaction processing systems always include localized bottle necks resulting in reliability problems when local computers go down for any reason. Furthermore, the asynchronous nature of a global manufacturing enterprise and the data it produces can strain traditional transaction processing systems. In traditional systems that process transactions sequentially, waiting for data, sometimes from operations that have not yet occurred, ties up resources that need this data to proceed with a transaction—in a manufacturing execution system, this is a common situation. In addition, the asynchronous nature of the transactions can result in a large amount of network traffic for transaction processing systems with message intensive commitment protocols.

Accordingly, it would be desirable to provide a transaction processing system having the ability to reliably process asynchronous transactions in an MES environment.

SUMMARY OF THE INVENTION

To address the shortcomings in known systems, the invention provides a method, system and computer program product for asynchronous transaction processing in a distributed computing environment.

According to the invention, a transaction is initiated by a client object when the client object initiates a transaction context and registers with the transaction context as a participant in the transaction. The client object also publishes an event, the event including a reference to the transaction context, a reference to the client object and information. At least one server object responsive to, or subscribing to, the event registers with the transaction context identified in the event, performs a logical operation using the information provided in the event, calls back the client object with a response to the event using the reference to the client object included in the event, and places a vote to commit or roll back the transaction with the transaction context. In order to perform its operations, a subscribing object may be provided with a database connection by the transaction context.

Upon receiving call backs from the server objects responsive to the event, the client object places a vote to commit or roll back the transaction with the transaction context. The client object then requests that the transaction context close the transaction. The transaction context reviews the votes and signals the client object with the outcome. If all of the transaction participants have voted to commit the transaction, the transaction context commits the transaction data to one or more databases. If at least one participant in the transaction has voted to roll back the transaction, the transaction context causes the transaction to be rolled back.

In one embodiment, a plurality of event publisher and event subscriber objects are provided on a plurality of host computers in the system of the invention, and one or more event channel objects are provided. When a client publishes an event, the client passes the event to an event publisher. The event publisher places the event in an appropriate event channel. The event is then passed by the event channel to each event subscriber. An event subscriber then passes the event on to an object of a class that subscribes to the event. If an object of a subscribing class is not running on a desired host computer, the event subscriber may call a subscriber thread pool to instantiate such an object.

In the system of the invention, a plurality of server objects may be responsive to an event published by a client. In that case, each responsive server object registers with the transaction context identified in the event, performs a logical operation using the information provided in the event, places a vote to commit or roll back the transaction with the transaction context, and calls back the client with a response to the event using the reference to the client included in the event. The client places its vote to commit or roll back the transaction with the transaction context after it has received responses from all of the responsive server objects.

In addition, a responsive server object may itself, as part of its logical operations, publish a second event. The second event contains a reference to the transaction context, a reference to the publishing server object, and information. Zero or more server objects can be responsive to the second event. The responsive second server object registers as a participant in the transaction using the transaction context identified in the second event, performs a logical operation using the information provided in the second event, places a vote with the transaction context to commit or roll back the transaction, and calls back the publishing server object with a response to the event using the reference to the server object provided in the second event. Subscribing objects may also be provided with a database connection by the transaction context.

BRIEF DESCRIPTION OF THE DRAWINGS

The features of the invention may be more fully understood from the following detailed description of the drawings in which.

DETAILED DESCRIPTION OF THE INVENTION

Figure 1:
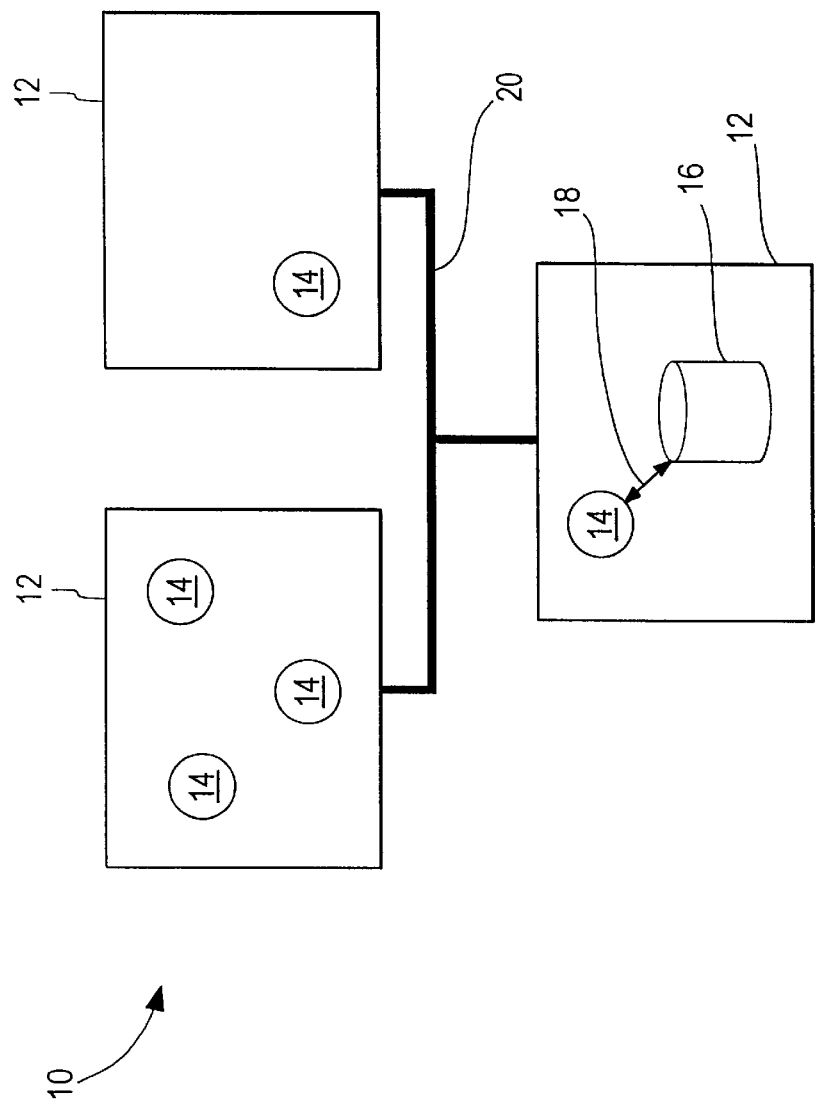
FIG. 1 illustrates a prior art distributed object computing environment.

The present invention provides an asynchronous transaction processing system for use in a distributed computing environment, and in particular, a distributed object computing environment. A simple distributed object computing environment 10 is illustrated in FIG. 1. The distributed object computing environment 10 includes a plurality of machines 12. Machines 12 may be actual computers, such as work stations or PCs commonly known in the art or any other computers useful as either server or client machines, special purpose machines, or virtual machines. As used herein, the term "host" generally refers to an actual computer that may be executing a plurality of virtual machines, processes or threads. In the context of a manufacturing execution system, special purpose machines might include bar code scanner systems or computerized inspection equipment. Virtual machines are software devices that operate on a computer but appears to software that runs on the virtual machine to be a complete computer. A common example of a virtual machine known in the art is the Java virtual machine, however, other types of virtual machines are available and may be used herein.

Software objects 14 may run on machines 12. Objects 14 may be created using any object-oriented software programming language known in the art such as C++, Java, Objective C, SmallTalk or others. Additionally, a number of visual and textual software development tools exist to help developers to define and create objects 14. One or more databases 16 may also be provided on one or more machines 12. Database 16 may be an object-oriented database or a relational database. Database 16 may also be encapsulated in an object wrapper, so as to appear as an object to the environment 10, or it may have a plurality direct connections 18 to one or more objects to interface the database to other components of the distributed object computing environment 10.

Machines 12 in the distributed object computing environment connect to each other using a communications network 20. While a variety of communications networks are known in the art, a particularly advantageous communications network for use with the invention is an Object Request Broker ("ORB"). An ORB is middleware that manages communications and data exchanges between objects, even when those objects are on different machines. The primary functions of an ORB include defining interfaces between objects, locating and activating remote objects, and communications between clients and objects. The goal of an ORB is to make it appear as if an object 14 is local to a client, while in fact the object 14 may reside in a different process or machine 12.

A variety of ORB standards are available for software development including COM/DCOM by Microsoft, the Common Object Request Broker Architecture ("CORBA") organized by the Object Management Group ("OMG"), and the Remote Method Invocation ("RMI") extensions to the Java language/virtual machine. Commercially available CORBA compliant ORBs presently include ORBIX by IONA Technology, VisiBroker by Inprise, PowerBroker by Expersoft, SmallTalkBroker by DNS Technologies, Object Director by Fujitsu, DSOM by IBM, DAIS by ICL, SORBET by Siemens Nixdorf, and NonStop DOM by Tandem. RMI, which allows Java objects to be executed remotely, provides ORB-like capabilities as a native extension of Java.

Communications network 20 may also include a publish-subscribe event protocol. In publish-subscribe communications, objects may publish information or requests of interest and other objects may subscribe to a selected subset of published material or events. Publish-subscribe or event-driven communications provide asynchronous communication among objects, that is, a publishing object need not wait for, or even know about, subscribing objects in order to publish. As an example of one possible publish-subscribe protocol, OMG has developed a standardized specification for event-based publish-subscribe communications and CORBA now includes a "CORBA Event Service" specification that includes a "CORBA Event Channel."

Figure 2:
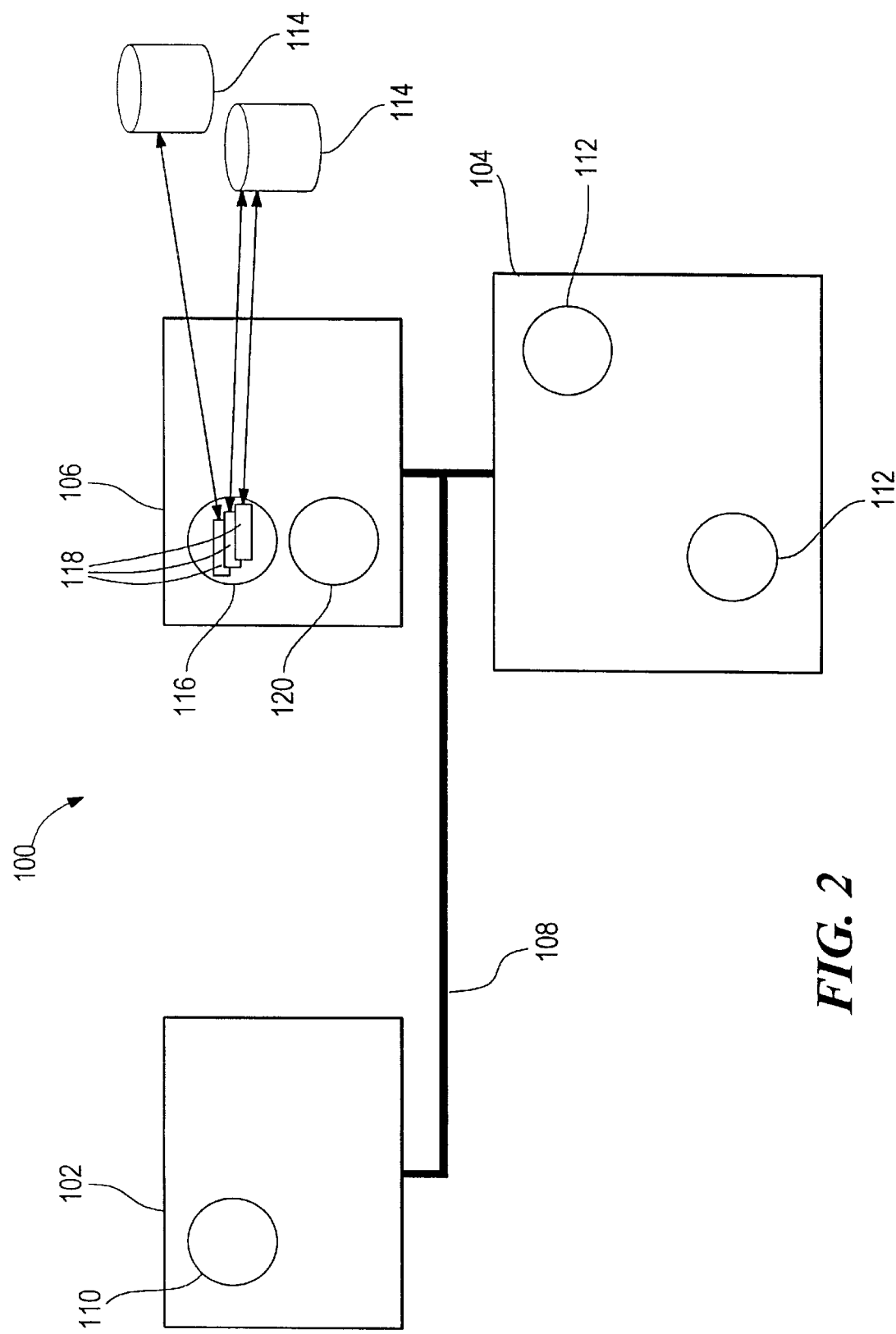
FIG. 2 illustrates a transaction processing system of the invention.

A transaction processing system 100 of the invention, illustrated in FIG. 2, includes a plurality of machines, and while the number or location or type of machines are not particularly limited, for convenience, the machines in FIG. 2 may be referred to as a client virtual machine 102, a server virtual machine 104, and a database machine 106. Each of these machines is connected by a communications network 108 which may be an ORB.

Transaction processing system 100 also includes at least one client object 110 and a plurality of server objects 112. It will be understood, consistent with the use of ORB technology, that these objects may be located anywhere in the transaction processing system 100 and need not be affiliated with a specific machine. Transaction processing system 100 further includes at least one database 114. In one embodiment, a connection manager 116, which maintains a pool of database connections 118, is provided to interface databases 114 with objects in the system 100 that may need database 114 access or services.

A transaction context object 120 is also used during the processing of a transaction. Transaction context 120 includes methods to add a participant in a transaction, register commit or rollback votes from participants, and can commit or rollback an entire set of operations and allow related objects access to uncommitted data. While the transaction context 120 may exist anywhere in the system 100, it may be convenient to provide the transaction context 120 on the same machine as the connection manager 116 given that a transaction that uses a transaction context 120 will also likely need database 114 access in order to be completed. Each transaction will have one transaction context 120.

Consistent with the distributed object model, connection manager 116 may be located on any machine connected to the communications network 108 and need not be located in proximity to a database 114 to which a connection is made. Connection manager 116 may be a single class that manages a pool of database connections 118. The database connections 118 themselves may be instances of a database connection class, may be addressable across an ORB and may maintain connections to any number of databases 114. Database connections 118 may be created, for example, using Java Database Connectivity ("JDBC"). JDBC provides classes that enable Java clients to interact with relational databases compliant with Microsoft's Open Database Connectivity. It includes facilities to open and close database connections, query metadata information, issue SQL statements, and get result sets and other database-related operations. Accordingly, connection manager 116 may manage relational database connectivity from anywhere within the distributed computing environment. In addition, more than one connection manager 116 may be employed in order to provide increased performance.

Client object 110 may be an ORB compliant object (such as a CORBA object) and have an associated Graphical User Interface ("GUI") to allow a system user to interact with the software to cause the client object to initiate a transaction. Alternatively, client object 110 may represent a client, for example a dedicated device, such as a bar code scanner, having an embedded processor or being connected to a general purpose computer that may be programmed with an object wrapper. For example, all CORBA objects are defined using Interface Definition Language (IDL). IDL is an object-oriented interface definition formalism that completely defines the interface between objects. Using IDL, a client may be made to appear to the system 100 as a CORBA object, regardless of the client's location or implementation.

A client may initiate a transaction on action of a user interacting with GUI. For example., a system user may wish to add or delete an employee from the list of employees at a particular manufacturing site. The user would interact with a GUI to provide the required information, perhaps including the employee's training and certifications or the specific manufacturing team in which the employee will be included, and indicate that the user interaction is complete, likely by activating a virtual "save" or "complete" button with a mouse. Transactions may also be initiated, for example, by a dedicated device such as a bar code scanner. If, for example, an inspection process results in a defect indication for a particular bar coded work item, either by automatic operation of the manufacturing inspection equipment or by user interaction, the bar code on the work item may be scanned to indicate that this particular item is defective. Transactions may also be initiated by some combination of the above, for example a user might scan the bar code of a defective work item, input information about the defective item through a GUI, and indicate that the interaction is completed to initiate a transaction. In each of these examples, data has been entered into the transaction processing system 100 and the system must process this data to update the appropriate databases and inform whatever other portions of the system 100 that have a need to know the newly entered data. It is likely that the client, or user interacting with the client, does not know how the data will be used within the system 100.

To initiate a transaction, a client object 110 creates a transaction context 120, for example by calling a transaction object to create a process for the transaction, and publishes an event. Creating a transaction may be performed by a stand-alone transaction object, or by a method that may be called on the connection manager 116 to create a new transaction context 120. The event published by the client object 110 will include a reference to the transaction context 120, a reference to the client object 110, and data. Data, for example, may include the bar code scan for a defective work item along with any other information entered by the client about that work item. The client object 110 also registers with the transaction context 120 as a participant in the transaction. Client object 110 may also have data to add to the databases as part of the transaction. If the transaction is ultimately committed, this data will be stored to one or more database 114.

Zero or more server objects 112 in the transaction processing system 100 can be responsive to the event published by the client object 110. Typically, one or more server objects 112 are responsive to an event, however, for some events and under some circumstances, it may be that there are no responsive server objects and the transaction may include only the publishing object as a participant. A responsive server object may include, for example, an object that updates work-in-process data to account for work items removed from their ordinary work flow because they are defective. Such an object would "listen" for or subscribe to events relating to defective work items and could perform some logic, which might include publishing events of its own. The responsive server object also uses the transaction context 120 reference provided in the event to register with the transaction context as a participant in the event. As with client object 110, server object 112 may have data to add to the databases as part of the transaction. As part of its operation, server object 112 may request database services in order to supply data for application in the transaction.

After registering with the transaction context 120 and performing any required logic, the server object 112 places a vote with the transaction context 120. If the logical operations performed by the server object 112 are successfully completed, the server object will typically vote to commit the transaction. If the logical operations are not successfully completed, the server object 112 will typically vote to roll back the transaction.

Using the reference to the client object 110 included in the event, the server object 112 will also call back the client object to inform the client object that the server object has acted on the event published by the client object and to send to the client object any data that forms an appropriate response to the event. For example, an event published by a client object 110 may include a request for data. A responsive server object 112 would perform the necessary logic to acquire the data and respond with that data to the client object 110 through a call back.

Once the client object 110 has received all expected call backs, the client object places its own vote with the transaction context 120 and requests that the transaction context close the transaction. The transaction context 120 will then review the votes placed for the transaction. If any transaction participant has voted to roll back the transaction, the transaction context 120 rolls back the transaction.

Figure 3:
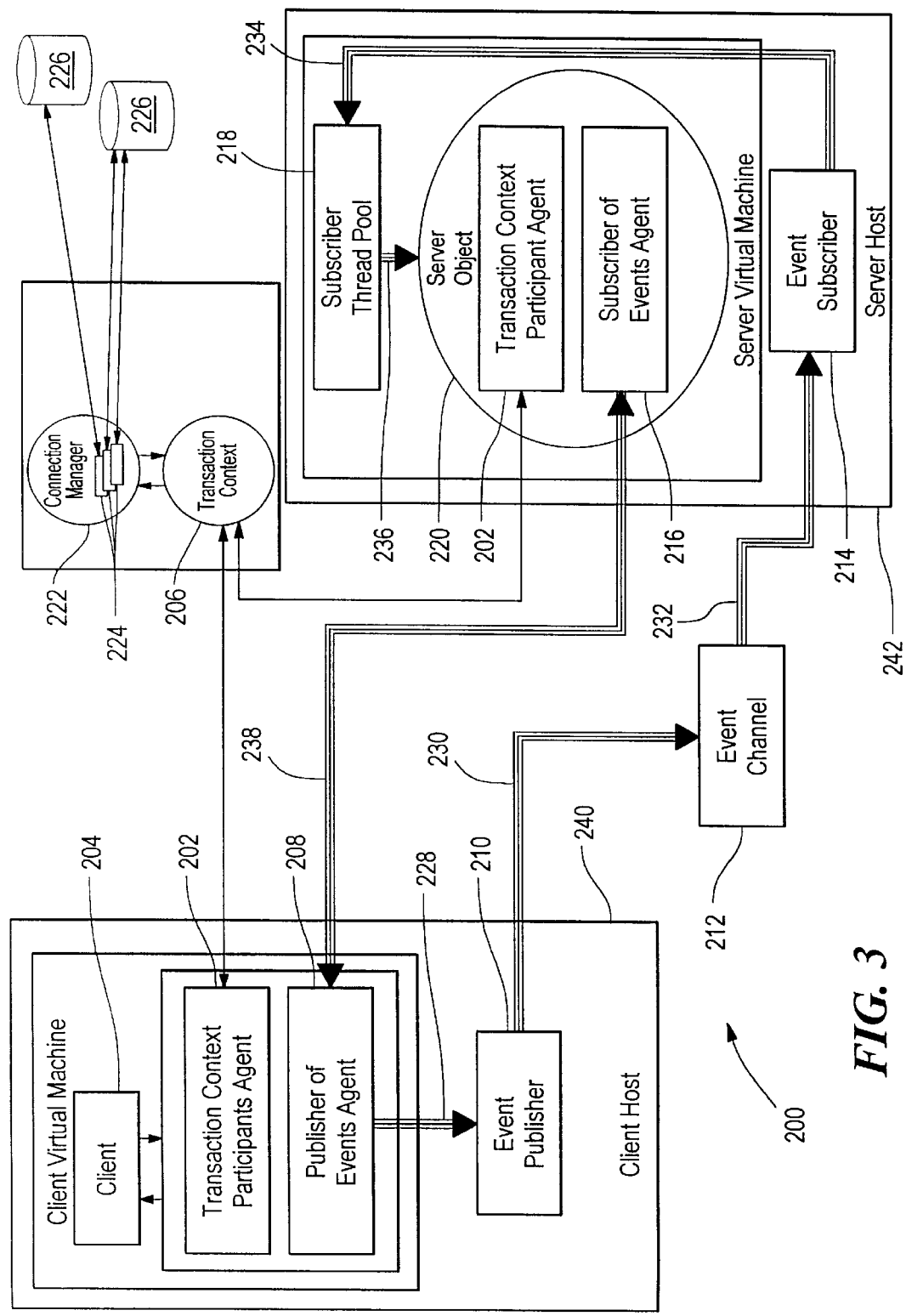
FIG. 3 illustrates an additional embodiment of the transaction processing system of the invention.

FIG. 3 illustrates an exemplary embodiment of the transaction processing system 200 of the invention.

Transaction processing system 200 includes a Transaction Context Participant Agent ("TCPA") 202. TCPA 202 is a class that provides the functionality necessary for an object to participate in a transaction. TCPA 202 may also provide the functionality required for a non-IDL object to participate in a transaction across an ORB. For example, where client 204 is not a CORBA object, TCPA 202 may provide the functionality required for the client 204 to interact across a CORBA ORB. The methods contained in TCPA 202 for participating in a transaction may include creating a new transaction context 206 and returning the CORBA Interoperable Object Reference ("IOR") for the transaction context created. An IOR is specifically intended to convey object reference protocol information across ORB and inter-ORB boundaries. Transaction context 206 may be located on the same machine as connection manager 222, which maintains a pool of databases connections 224 to one or more databases 226.

The object that creates a transaction context can be identified as the creator of a transaction by setting a "creator" flag in the TCPA. The creator of a transaction may have special privileges such as the ability to close the transaction. TCPA 202 may also include methods for adding the object having the TCPA to a transaction using the transaction context 206 IOR, adding data to the transaction, requesting database services, registering a commit or rollback vote with the transaction context, closing the transaction, checking to see if all participants have voted, getting a list of participants in the transaction and retrieving data from the transaction.

Figure 3A:
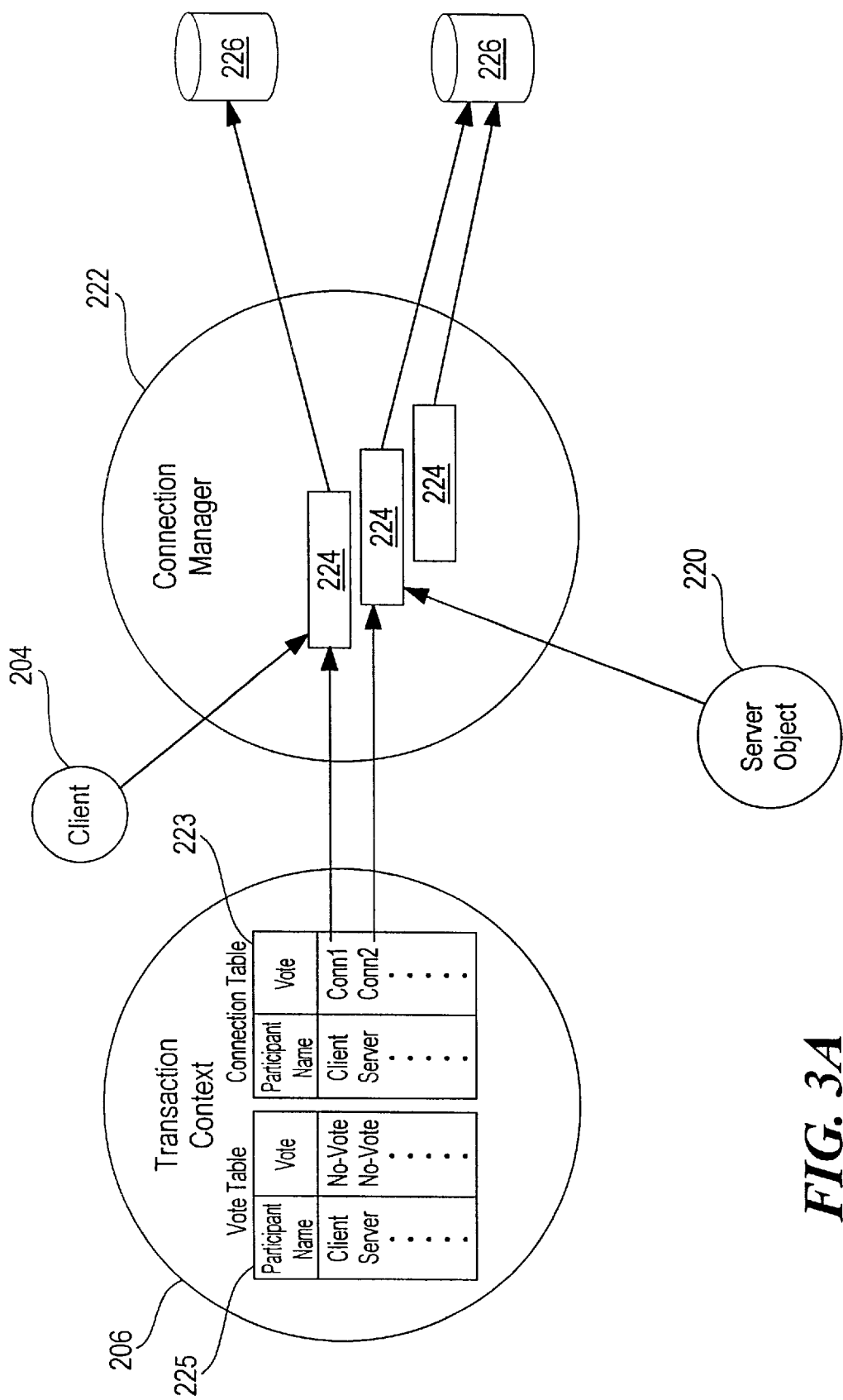
FIG. 3A illustrates a Transaction Context and database connections useful with the transaction processing system of FIG. 3.

A more detailed view of Transaction Context 206 is provided in FIG. 3A. When a transaction participant such as client 204 or server object 220 registers with Transaction Context 206, if the participant requires a database connection 224 to store data as part of the transaction, the participant requests a database connection 224 from Transaction Context 206 when it registers. Transaction Context 206 requests the database connection 224 from Connection Manager 222 which provides the connection from a pool of connections that it maintains, or, if necessary, Connection Manager 222 creates a new database connection.

Once passed to Client 204 or server object 220, database connections 224 can be used to store uncommitted data as part of the transaction. Transaction Context 206 also retains a reference to each database connection 224 that is passed and the name of the participant that the connection was passed to in a Connection Table 223. Transaction Context 206 also maintains a Vote Table 225 to track the vote placed by each participant and the participant name. Generally, participants will place a "no-vote" vote upon registration, and vote to commit or roll back the transaction after performing logical operations. When the transaction is closed, if each participant has voted to commit, Transaction Context 206 sends a commit data message to each database connection 224 listed in Connection Table to commit the uncommitted data and the database connections can be returned to the Connection Manager's 222 connection pool.

When client object 204 publishes an event, the event carries with it TCPA data such as the transaction context 206 IOR. In this manner, any object in the transaction processing system 200 that subscribes to the published event may register directly with the transaction context 206 and participate in the transaction.

Events may be published by a client 204 using event services provided in the transaction processing system 200 as illustrated in FIG. 3. Publisher of Events Agent ("PEA") 208, Event Publisher 210, Event Channel 212, Event Subscriber 214 and Subscriber for Events Agent ("SEA") 216 are all objects connected to a communications network. That is, these objects may be CORBA objects, but the objects themselves are part of the transaction processing system 200 and are not part of the ORB. As such, these objects can implement a multicasting and distributed callback system of messaging within the transaction processing system 200 above and beyond any messaging services provided as part of the ORB.

In an exemplary embodiment, a PEA 208 class provides a CORBA object that is called by a publishing client to publish an event. PEA 208 attaches a reference to itself to the event, such as an IOR that refers to itself, and sends the event to Event Publisher 210. PEA 208 also returns responses from objects that subscribe to the event to the publishing client.

Event Publisher 210 provides a way for objects to publish events in the distributed transaction processing system 200. Event Publisher 210 receives events from the publishing object and places them on the appropriate Event Channel 212. Events may conveniently be published as serialized objects. Event Publisher 210 may maintain a list of subscriber classes for specific event types. Lists of this type may stored in an administrator object and requested by Event Publisher 210 as needed. Having this information, Event Publisher 210 can provide PEA 208 with a list of all subscribing classes upon publication of an event. Having this list, PEA 208 can determine whether it has received responses from each subscribing class.

In the transaction processing system 200, events include TCPA data referring to transaction context 206 and PEA data referring to the PEA 208 for the publishing client. Event Publisher 210 may also add load balancing information into the event. That is, Event Publisher 210 may query the transaction processing system for particular host machines that have a low load and can include information relating to that low load machine or subscriber in the event in order to direct the event to the low load machine.

Consistent with the distributed object architecture, PEA 208 may look up an Event Publisher 210 that is located on or affiliated with its host machine (as illustrated in FIG. 3), or PEA 208 may look up an Event Publisher 210 anywhere within system 200 using CORBA to locate and communicate with the Event Publisher.

Event Channel 212 implements an event channel that is similar to channels provided in the CORBA Event Service. Any number of Event Channels 212 may be provided and Event Channels may be provided on any machine in the transaction processing system 200 and an Event Publisher 210 may locate and communicate with an Event Channel using CORBA services. Event Channel 212 receives an event from an Event Publisher 210 and sends the event on to all Event Subscribers 214 (only one shown). One advantage to providing an event service in parallel with the underlying ORB is that, because the ORB services are minimally used, transaction processing system 200 can easily be configured to run on multiple ORBs. For example, transaction processing system 200 can readily be configured to operate with CORBA or with COM/DCOM or other ORBs known in the art.

Event Subscriber 214 provides a way for classes to "register" for specific events. Event Subscriber 214 receives events from an Event Channel 212 and forwards the events to the appropriate classes. On startup, Event Subscriber 214 contacts an administrator object to obtain a list of all classes in its scheme and the location of every Event Channel 212 that is defined in the transaction processing system. Event Channel 212 calls each Event Subscriber 214 whenever there is an event in the channel to be processed. Event Subscriber 214 parses the event and determines whether the event is subscribed to by an object on its host. If so, Event Subscriber 214 passes the event directly to the subscribing object.

If no subscribing object is instantiated on the desired host, Event Subscriber 214 checks to see whether a Subscriber Thread Pool 218 is running for the subscribing class. If not, Event Subscriber 214 starts a new Subscriber Thread Pool 218, typically in a new Java virtual machine, and passes the event to the Subscriber Thread Pool 218. The Subscriber Thread Pool 218 instantiates the subscribing object, such as server object 220, and passes the event to the instantiated subscribing object. The subscribing object then processes the event. In this way, events can be directed to specific machines, either for load balancing purposes or because the event has specific processing needs that are met by a specific machine, whether or not the subscribing object is running on that machine.

While providing an Event Subscriber 214 on each server host as illustrated in FIG. 3 may be beneficial under some circumstances, consistent with the distributed object architecture described herein, one or more Event Subscribers 214 may be present anywhere within system 200 without regard to the physical structure of the network. That is, Event Subscriber 214 need not be located on server host 242, but only needs to be connected to objects running on server host 242 through an ORB.

For example, when a published event includes load balancing information that specifies a particular server host to process an event, Event Channel 212 sends that event to each Event Subscriber 214 in the system 200 and each Event Subscriber 214 parses the event to determine whether that Event Subscriber is the Event Subscriber that should further process the event. If an Event Subscriber 214 does conclude that it should handle the event, that Event Subscriber passes the event to a subscribing object on the identified host through the ORB. If the subscribing object is not running on that host, Event Subscriber 214 can call Subscriber Thread Pool 218 on that host to instantiate the subscribing object before passing the event on.

A subscribing object, such as server object 220, may also include a Subscriber for Events Agent ("SEA") 216. The SEA class gives the subscribing object an interface to Event Subscriber 214 for receiving events, and also provides a way for the subscribing object to return results to the publishing object. Because the event includes a reference to the PEA 208 of the publishing object, SEA 216 can direct results back from the subscribing object to the publishing object PEA 208 which can then hand the result off to the client.

Server object 220 also joins in the transaction by starting its own TCPA 202 based on the publishing objects TCPA 202 data which includes an IOR for the Transaction Context 206. TCPA 202 allows server object 220 to register as a participant in the transaction, to access data stored in the transaction, to request database services through the Transaction context 206, and to register the server object's vote to commit or roll back the transaction.

The flow of an event through transaction processing system 200 from a single client to a single subscribing object is illustrated by arrows 228, 230, 232, 234, 236, 238. PEA 208 publishes an event at the request of client 204 by first passing 228 the event to an Event Publisher 210. The Event Publisher 210 then publishes the event to the larger transaction processing system 200 by passing 230 the event, likely by means of an ORB, to an Event Channel 212 that may be running on any machine in the system 200. Event Channel 212 then passes 232 the event on to all Event Subscribers 214. In one embodiment, one Event Subscriber is provided on each host, such as server host 242 for the purpose of directing events to any object located on that host that subscribes to such events. Event Subscriber 214 then passes the event to subscribing objects on its host. If a subscribing object, such as server object 220, is not running on the host, Event Subscriber 214 can call 234 Subscriber Thread Pool 218 to instantiate such an object. The event is then passed 236 to the subscribing object. After the subscribing object performs its logical operations based on the event data, the subscribing object SEA 216 responds to the client 204 through a direct call back 238.

The event handling mechanism of transaction processing system 200 has been illustrated using a single subscribing object, however, any number of objects (including zero objects) may subscribe to a given event on any number of machines. Each subscribing object can respond to the publishing object using a distributed call back through its SEA and each subscribing object can participate in the Transaction context 206 through its TCPA. In addition each subscribing object may, as part of the logic it performs as a result of receiving the event, may publish its own event or events. Events published by a subscribing object would contain the same TCPA reference data as the original event and would also include a reference to a PEA for the subscribing-turned-publishing object.

Figure 4:
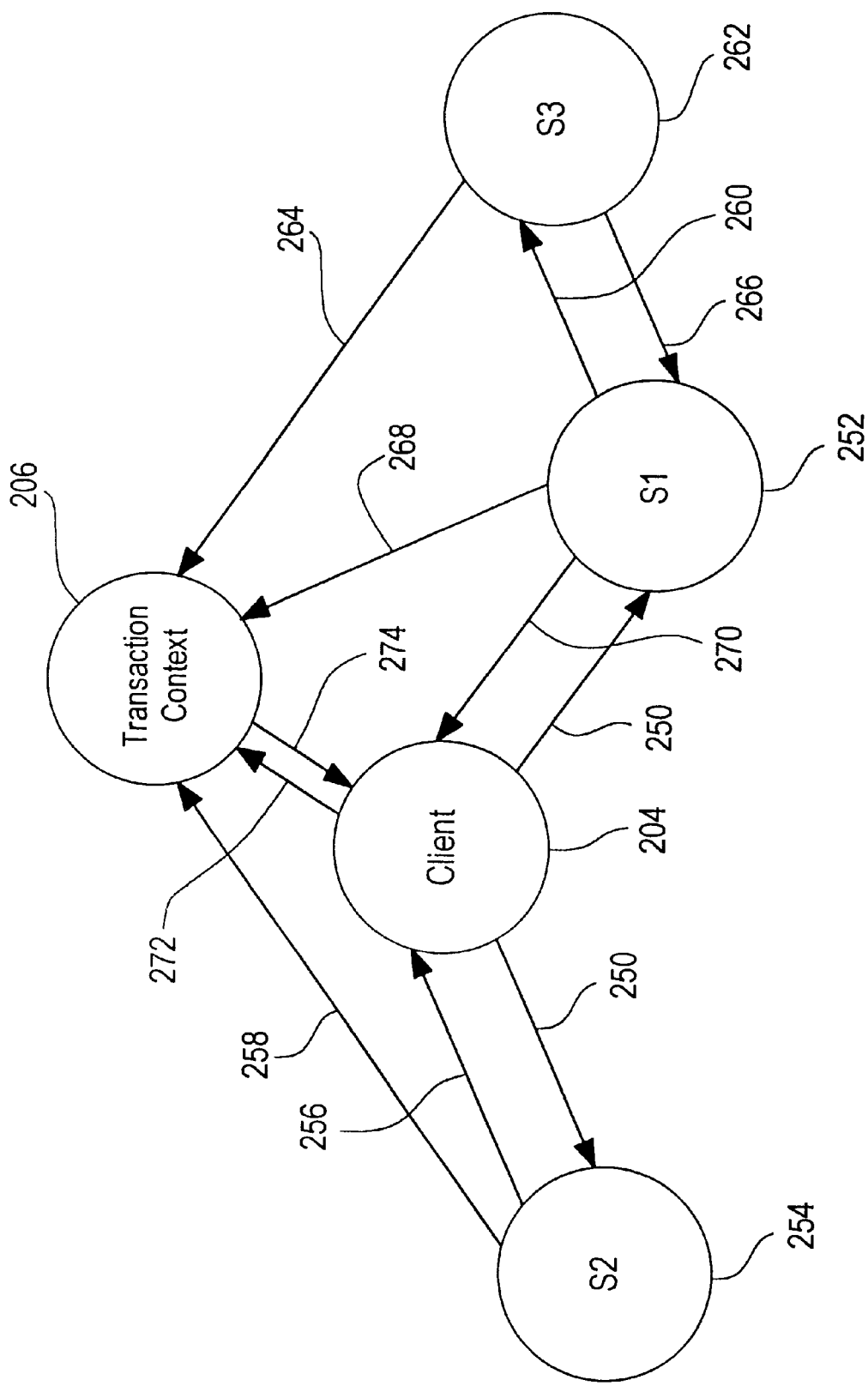
FIG. 4 illustrates communications among objects using the transaction processing system of FIG. 3.

An example of event, call back and vote messaging with more than one subscribing object is illustrated in FIG. 4. An exemplary transaction is started by client 204 which creates transaction context 206. Client 204 publishes an event for which S1 252 and S2 254 are subscribing objects. S2 254 registers with transaction context 206, makes any necessary database connections through transaction context 206 and performs whatever logic S2 performs. S2 then calls back 256 client 204 and votes 258 with transaction context 206 to commit or roll back the transaction based on whether S2's logical operations were successfully performed. S1 also subscribes to the event, registers as a transaction participant with transaction context 206 and acquires any necessary database connections through transaction context 206. In this example, in order for S1 to complete its logical operations, it publishes 260 a new event to which object S3 262 subscribes. S3 262 then registers as a transaction participant with transaction context 206, makes any necessary database connections through transaction context 206 and performs whatever logic S3 performs. S3 262 then votes 264 with transaction context 206 to commit or roll back the transaction and calls back 266 S1 252 with its results. With results received from S3 262, S1 252 completes its logical operations, votes 268 with transaction context 206 to commit or roll back the transaction and calls back 270 client 204 with its results. Each of the participating objects may request database connections from Transaction Context 206 and may, as part of its logical operation, place data into those database connections for commitment to a database if the transaction is ultimately committed. Having received results from each of the objects that subscribe to its event, client 204 votes 272 to commit or roll back the transaction and signals transaction context 206 to close the transaction. Transaction context 206 then commits or rolls back the transaction as appropriate based on the voting and reports the result back 274 to the client.

Where Transaction Context 206 tracks voting and database connection information by name as illustrated in FIG. 3A, it is possible for different objects of the same type to share a database connection. For example, if subscribing objects S2 and S3 are objects of the same typed, Add_Employee server objects for example, these objects may share the same database connection based on their name entry in Transaction Context 206. This would allow the last Add-Employee server object to act to have the final say as to what data Add_Employee will place in the database. This ensures that the Add_Employee data will not be inconsistent between different Add_Employee server objects in the same transaction. It also allows the later acting Add_Employee server object to have access to uncommitted data placed on the database connection by a prior acting Add_Employee server object, ensuring that the later acting object has access to the most recent data. These objects could also share the same vote in Vote Table 225, however, in many situations, it is preferable for each participant to have its own vote.

As indicated heretofore, aspects of this invention pertain to specific "methods" and "method functions" implementable on computer systems. Those of ordinary skill in the art should readily appreciate that computer code defining these functions can be delivered to a computer in many forms; including, but not limited to: (a) information permanently stored on non-writable storage media (e.g., read only memory devices within a computer or CD-ROM disks readable by a computer I/O attachment); (b) information alterably stored on writable storage media (e.g., floppy disks and hard drives); or (c) information conveyed to a computer through communication media such as telephone networks. It should be understood, therefore that such media, when carrying such information, represent alternate embodiments of the present invention.

It will be understood that the foregoing is only illustrative of the principles of the invention, and that various modifications can be made by those skilled in the art without departing from the scope and spirit of the invention.

What is claimed is:

1. A method for asynchronous transaction processing in a distributed computing environment including at least one client object and at least one server object comprising the steps of:

a) initiating a transaction by a client object, the client object initiating a transaction context and registering as a participant with the transaction context;

b) publishing an event by the client object, the event including a reference to the transaction context, a reference to the client object and information;

c) registering with the transaction context as a participant by at least one server object responsive to the event, the at least one server object responsive to the event:
  i) performing logical operations using the information provided in the event;
  ii) placing a vote to commit or roll back the transaction with the transaction context; and
  iii) calling back the client object with a response to the event using the reference to the client object included in the event;
d) upon receiving a call back from the at least one server object responsive to the event, placing a vote to commit or roll back the transaction with the transaction context by the client object;
e) passing a request from the client object to the transaction context to close the transaction;
f) reviewing the votes in the transaction context and:
  i) if all of the transaction participants have voted to commit the transaction, the transaction context causes the transaction to be committed to at least one database; or
  ii) if at least one participant in the transaction has voted to roll back the transaction, the transaction context signals the client object of the roll back vote and causes the transaction to be rolled back.

2. The method of claim 1, wherein the transaction context provides a database connection to at least one participant in the transaction.

3. The method of claim 2, wherein when the transaction is committed, the transaction context signals each participant database connection to commit data to a database.

4. The method of claim 1, wherein the client object includes a client encapsulated in an object wrapper.

5. The method of claim 1, wherein the distributed computing environment includes a plurality of most computers.

6. The method of claim 5, wherein publishing an event includes passing the event to an event publisher for further publication into an event channel.

7. The method of claim 6, wherein the event channel passes the event to a plurality of event subscribers, each event subscriber maintaining a list of server objects responsive to the event and wherein for each event published, at least one event subscriber passes the event from the event channel to a subscribing object that is responsive to the event.

8. The method of claim 7, wherein an event subscriber directs an event to a subscribing object on a desired host machine that is identified in the event.

9. The method of claim 8, wherein the desired host computer includes a subscriber thread pool wherein when an event subscriber directs an event to a subscribing class on the desired host computer but no object of that class is running on the desired host computer, the event subscriber calls the subscriber thread pool to instantiate a server object responsive to the event.

10. The method of claim 9, wherein the event subscriber starts a subscriber thread pool for the subscribing class.

11. The method of claim 1, wherein a plurality of server objects are responsive to the event, each responsive server object:
  a) registering with the transaction context identified in the event;
  b) performing a logical operation using the information provided in the event;
  c) placing a vote to commit or roll back the transaction with the transaction context; and
  d) calling back the client object with a response to the event using the reference to the client object included in the event; the client object placing a vote to commit or roll back the transaction with the transaction context after receiving call backs from each responsive server object.

12. The method of claim 1, wherein the responsive server object, as part of its logical operation, publishes a second event including a reference to the server object, a reference to the transaction context and information, at least one second server object being responsive to the second event, the second server object:
  a) registering as a participant with the transaction context identified in the second event;
  b) performing a logical operation using the information provided in the second event;
  c) placing a vote to commit or roll back the transaction with the transaction context; and
  d) calling back the server object with a response to the event using the reference to the server object included in the second event; the server object calling back the client object and placing a vote with the transaction context after receiving a call back from the second server objects.

13. The method of claim 1, wherein the distributed computing environment is a distributed manufacturing execution system environment and the at least one client object inputs information to the manufacturing execution system from a manufacturing floor.

14. In a distributed object computing environment including a plurality of host computers connected by an object request broker, a system for asynchronously processing a transaction comprising:
  a) at least one client object class including means for instantiating a client object, the client object having means for initiating a transaction including means for initiating a transaction context, means for registering with the transaction context as a participant in the transaction, means for publishing an event having a reference to the client object, a reference to the transaction context and data, a means for placing a vote to commit or roll back the transaction with the transaction context, and a means for requesting that the transaction context close the transaction;
  b) at least one server object class including means for instantiating a server object, the server object being responsive to an event published by the client object and having a means for registering with the transaction context identified in the event as a transaction participant, a means for performing a logical operation with the data included in the event, a means for placing a vote to commit or roll back the transaction with the transaction context identified in the event, and a means for making a call back to the client object identified in the event with results of the logical operation;
  c) a transaction context class having means responsive to a client object for instantiating a transaction context object having a means for registering participants in a transaction and for recording votes on whether to commit or roll back the transaction, the transaction context including means for committing the transaction to one or more databases.

15. The system of claim 14, wherein the transaction context class further includes means for providing a database connection to at least one participant in the transaction.

16. The system of claim 14, wherein the client object includes a client encapsulated in an object wrapper.

17. The system of claim 14, further comprising at least one event publisher wherein publishing an event includes passing the event to an event publisher for further publication into an event channel.

18. The system of claim 17, further comprising at least one event subscriber, the event subscriber passing an event from the event channel to a subscribing object on a desired host machine that is identified in the event.

19. The system of claim 18, further comprising a plurality of event subscribers wherein each event subscriber receives the event from the event channel and maintaining a list of server object classes responsive to the event and wherein at least one event subscriber passes the event from an event channel to a subscribing object on the desired host computer that is responsive to the event.

20. The system of claim 19, wherein the desired host computer includes a subscriber thread pool wherein when an event subscriber directs an event to a subscribing class on the desired host computer but no object of that class is running on the desired host computer, the event subscriber calls the subscriber thread pool to instantiate a server object responsive to the event.

21. The system of claim 20, wherein the event subscriber starts a subscriber thread pool for the subscribing class.

22. The system of claim 14, wherein a plurality of server objects are responsive to the event, each responsive server object:
   a) registering with the transaction context identified in the event;
   b) performing a logical operation using the information provided in the event;
   c) placing a vote to commit or roll back the transaction with the transaction context; and
   d) calling back the client object with a response to the event using the reference to the client object included in the event; the client object placing a vote to commit or roll back the transaction with the transaction context after receiving call backs from each responsive server object.

23. The system of claim 14, wherein the responsive server object, as part of its logical operation, publishes a second event including a reference to the server object, a reference to the transaction context and information, at least one second server object being responsive to the second event, the second server object:
   a) registering as a participant with the transaction context identified in the second event;
   b) performing a logical operation using the information provided in the second event;
   c) placing a vote to commit or roll back the transaction with the transaction context; and
   d) calling back the server object with a response to the event using the reference to the server object included in the second event; the server object calling back the client object and placing a vote with the transaction context after receiving a call back from the second server object.

24. In a system for asynchronously processing a transaction in a distributed object computing environment including a plurality of host computers connected by an object request broker, a computer program product comprising a computer useable medium having computer readable program code to direct the system to perform at least the following steps:
   a) initiating a transaction by a client object, the client object initiating a transaction context and registering as a participant with the transaction context;
   b) publishing an event by the client object, the event including a reference to the transaction context, a reference to the client object and information;
   c) registering with the transaction context as a participant by at least one server object responsive to the event, the at least one server object responsive to the event:
      i) performing logical operations using the information provided in the event;
      ii) placing a vote to commit or roll back the transaction with the transaction context; and
      iii) calling back the client object with a response to the event using the reference to the client object included in the event;
   d) upon receiving a call back from the at least one server object responsive to the event, placing a vote to commit or roll back the transaction with the transaction context by the client object;
   e) passing a request from the client object to the transaction context to close the transaction;
   f) reviewing the votes in the transaction context and:
      i) if all of the transaction participants have voted to commit the transaction, the transaction context causes the transaction to be committed to at least one database; or
      ii) if at least one participant in the transaction has voted to roll back the transaction, the transaction context signals the client object of the roll back vote and causes the transaction to be rolled back.

25. The computer program product of claim 24, wherein a plurality of server objects are responsive to the event, each responsive server object:
   a) registering with the transaction context identified in the event;
   b) performing a logical operation using the information provided in the event;
   c) placing a vote to commit or roll back the transaction with the transaction context; and
   d) calling back the client object with a response to the event using the reference to the client object included in the event; the client object placing a vote to commit or roll back the transaction with the transaction context after receiving call backs from each responsive server object.

26. The method of claim 24, wherein the responsive server object, as part of its logical operation, publishes a second event including a reference to the server object, a reference to the transaction context and information, at least one second server object being responsive to the second event, the second server object:
   a) registering as a participant with the transaction context identified in the second event;
   b) performing a logical operation using the information provided in the second event;
   c) placing a vote to commit or roll back the transaction with the transaction context; and
   d) calling back the server object with a response to the event using the reference to the server object included in the second event; the server object calling back the client object and placing a vote with the transaction context after receiving a call back from the second server object.

27. A method for asynchronous transaction processing in a distributed computing environment including at least one client object and at least one server object comprising the steps of:

a) initiating a transaction by a client object, the client object initiating a transaction context and registering as a participant with the transaction context;

b) publishing an event by the client object, the event including a reference to the transaction context and information;

c) registering with the transaction context as a participant by at least one server object responsive to the event, the at least one server object responsive to the event:
  i) performing logical operations using the information provided in the event; and
  ii) placing a vote to commit or roll back the transaction with the transaction context;

d) placing a vote to commit or roll back the transaction with the transaction context by the client object;

e) passing a request from the client object to the transaction context to close the transaction;

f) reviewing the votes in the transaction context and:
  i) if all of the transaction participants have voted to commit the transaction, the transaction context causes the transaction to be committed to at least one database; or
  ii) if at least one participant in the transaction has voted to roll back the transaction, the transaction context signals the client object of the roll back vote and causes the transaction to be rolled back.

28. The method of claim 27, wherein the transaction context provides a database connection to at least one participant in the transaction.

29. The method of claim 28, wherein when the transaction is committed, the transaction context signals each participant database connection to commit data to a database.

30. The method of claim 27, wherein the client object includes a client encapsulated in an object wrapper.

31. The method of claim 27, wherein the distributed computing environment includes a plurality of host computers.

32. The method of claim 31, wherein publishing an event includes passing the event to an event publisher for further publication into an event channel.

33. The method of claim 32, wherein the event channel passes the event to a plurality of event subscribers, each event subscriber maintaining a list of server objects responsive to the event and wherein for each event published, at least one event subscriber passes the event from the event channel to a subscribing object that is responsive to the event.

34. The method of claim 33, wherein an event subscriber directs an event to a subscribing object on a desired host machine that is identified in the event.

35. The method of claim 34, wherein the desired host computer includes a subscriber thread pool wherein when an event subscriber directs an event to a subscribing class on the desired host computer but no object of that class is running on the desired host computer, the event subscriber calls the subscriber thread pool to instantiate a server object responsive to the event.

36. The method of claim 35, wherein the event subscriber starts a subscriber thread pool for the subscribing class.

37. The method of claim 27, wherein a plurality of server objects are responsive to the event, each responsive server object:
  a) registering with the transaction context identified in the event;
  b) performing a logical operation using the information provided in the event; and
  c) placing a vote to commit or roll back the transaction with the transaction context.

38. The method of claim 27, wherein the responsive server object, as part of its logical operation, publishes a second event including a reference to the transaction context and information, at least one second server object being responsive to the second event, the second server object:
  a) registering as a participant with the transaction context identified in the second event;
  b) performing a logical operation using the information provided in the second event; and
  c) placing a vote to commit or roll back the transaction with the transaction context.

39. The method of claim 27, wherein the distributed computing environment is a distributed manufacturing execution system environment and the at least one client object inputs information to the manufacturing execution system from a manufacturing floor.

* * * * *